United States Patent
Parfenov et al.

(10) Patent No.: US 9,373,053 B2
(45) Date of Patent: Jun. 21, 2016

(54) IMAGE PROCESSOR WITH EDGE SELECTION FUNCTIONALITY

(71) Applicant: LSI Corporation, San Jose, CA (US)

(72) Inventors: Denis V. Parfenov, Moscow (RU); Denis V. Parkhomenko, Moscow (RU); Ivan L. Mazurenko, Moscow (RU); Pavel A. Aliseychik, Moscow (RU); Alexander B. Kholodenko, Moscow (RU)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 148 days.

(21) Appl. No.: 14/237,072

(22) PCT Filed: Aug. 27, 2013

(86) PCT No.: PCT/US2013/056770
§ 371 (c)(1),
(2) Date: Feb. 4, 2014

(87) PCT Pub. No.: WO2014/123583
PCT Pub. Date: Aug. 14, 2014

(65) Prior Publication Data
US 2015/0220804 A1    Aug. 6, 2015

(30) Foreign Application Priority Data

Feb. 5, 2013   (RU) .......................... 2013104895/07

(51) Int. Cl.
*G06K 9/48*     (2006.01)
*G06K 9/46*     (2006.01)
(Continued)

(52) U.S. Cl.
CPC ............ *G06K 9/4604* (2013.01); *G06K 9/4638* (2013.01); *G06K 9/52* (2013.01); *G06T 5/002* (2013.01); *G06T 7/0051* (2013.01); *G06T 7/0083* (2013.01); *G06T 7/0085* (2013.01)

(58) Field of Classification Search
None
See application file for complete search history.

(56) References Cited

U.S. PATENT DOCUMENTS 5,767,978 A * 6/1998 Revankar ........... H04N 1/40062
                                                    358/296
6,778,698 B1 * 8/2004 Prakash ................. G06K 9/342
                                                    382/164

(Continued)

FOREIGN PATENT DOCUMENTS

CN         102404594 A       4/2012
WO   PCT/US2013/056770       3/2014

OTHER PUBLICATIONS

Removal of mixed,lost—Cameras, Kim et al., IEEE, Jun. 2012, pp. 1-8.*

(Continued)

*Primary Examiner* — Jayesh A Patel

(57) ABSTRACT

An image processing system comprises an image processor configured to perform an edge detection operation on a first image to obtain a second image, to identify particular edges of the second image that exhibit at least a specified reliability, and to generate a third image comprising the particular edges and excluding other edges of the second image. By way of example only, in a given embodiment the first image may comprise a depth image generated by a depth imager, the second image may comprise an edge image generated by applying the edge detection operation to the depth image, and the third image may comprise a modified edge image having only the particular edges that exhibit at least the specified reliability.

20 Claims, 6 Drawing Sheets

(51) Int. Cl.
*G06K 9/52* (2006.01)
*G06T 5/00* (2006.01)
*G06T 7/00* (2006.01)

(56) References Cited

U.S. PATENT DOCUMENTS

| | | | | |
|---|---|---|---|---|
| 7,003,161 | B2 * | 2/2006 | Tessadro | G06T 7/0083 382/199 |
| 8,131,084 | B2 * | 3/2012 | Kim | G06T 5/20 382/199 |
| 8,284,239 | B2 * | 10/2012 | Chiu | B60R 1/12 348/47 |
| 2005/0074140 | A1 * | 4/2005 | Grasso | G06T 7/2033 382/103 |
| 2009/0245571 | A1 * | 10/2009 | Chien | G06K 9/38 382/103 |
| 2010/0054622 | A1 * | 3/2010 | Adams | G06T 3/403 382/269 |
| 2011/0081087 | A1 * | 4/2011 | Moore | G06T 7/0085 382/199 |
| 2012/0281872 | A1 * | 11/2012 | Zitnick, III | G06K 9/4623 382/103 |

OTHER PUBLICATIONS

John Canny, "A Computational Approach to Edge Detection," IEEE Transactions on Pattern Analysis and Machine Intelligence, Nov. 1986, pp. 679-698, vol. 8, No. 6.

R. Kimmel et al., "On Regularized Laplacian Zero Crossings and Other Optimal Edge Integrators," International Journal of Computer Vision, Jan. 2003, pp. 225-243, vol. 53, No. 3.

William K. Pratt, "Digital Image Processing," PIKS Inside, Third Edition, 2001, 738 pages.

Nicholas J. Higham, "Accuracy and Stability of Numerical Algorithms," SIAM, Second Edition, 2002, 710 pages.

L. Zhang et al., "An Edge-Guided Image Interpolation Algorithm via Directional Filtering and Data Fusion," IEEE Transactions on Image Processing, Aug. 2006, pp. 2226-2238, vol. 15, No. 8.

D. Ziou et al., "Edge Detection Techniques—An Overview," International Journal of Pattern Recognition and Image Analysis, 1998, 41 pages, vol. 8.

S.-Y. Kim et al., "Removal of Mixed, Lost, and Noisy Depth Pixels in Time-of-Flight RGB-D Cameras," IEEE Transactions on Multimedia (double.pdf), Jun. 2012, 8 pages.

\* cited by examiner

US 9,373,053 B2

IMAGE PROCESSOR WITH EDGE SELECTION FUNCTIONALITY

CROSS-REFERENCE TO RELATED APPLICATIONS

This application is a national stage application under 35 U.S.C. §371 of and claims priority to International Application No. PCT/US2013/056770, filed Aug. 27, 2013, which is an international application of and claims priority to Russia Application No. 2013104895, filed Feb. 5, 2013; this application claims priority to Russia Application No. 2013104895, filed Feb. 5, 2013; International Application No. PCT/US2013/056770 and Russia Application No. 2013104895 are hereby expressly incorporated herein in their entirety.

FIELD

The field relates generally to image processing, and more particularly to processing of edges detected in one or more images.

BACKGROUND

A wide variety of different techniques are known for detecting edges in images. Such techniques generally produce acceptable results when applied to high-resolution images, such as photographs or other two-dimensional (2D) images produced by a digital camera. However, many important machine vision applications utilize three-dimensional (3D) images generated by depth imagers such as structured light (SL) cameras or time of flight (ToF) cameras. These depth images are often low-resolution images and typically include highly noisy and blurred edges.

Conventional edge detection techniques generally do not perform well when applied to depth images. For example, these conventional techniques may either miss important edges in a given depth image or locate multiple spurious edges along with the important edges. The resulting detected edges are of poor quality and therefore undermine the effectiveness of subsequent image processing operations such as feature extraction, pattern identification, gesture recognition, object recognition and tracking.

SUMMARY

In one embodiment, an image processing system comprises an image processor configured to perform an edge detection operation on a first image to obtain a second image, to identify particular edges of the second image that exhibit at least a specified reliability, and to generate a third image comprising the particular edges and excluding other edges of the second image.

By way of example only, the first image in given embodiment may comprise a depth image generated by a depth imager, the second image may comprise an edge image generated by applying the edge detection operation to the depth image, and the third image may comprise a modified edge image having only the particular edges that exhibit at least the specified reliability.

Other embodiments of the invention include but are not limited to methods, apparatus, systems, processing devices, integrated circuits, and computer-readable storage media having computer program code embodied therein.

BRIEF DESCRIPTION OF THE DRAWINGS

FIGS. 4A and 4B are also collectively referred to herein as FIG. 4.

DETAILED DESCRIPTION

Embodiments of the invention will be illustrated herein in conjunction with exemplary image processing systems that include image processors or other types of processing devices and implement techniques for generating edge images having reliable edges. It should be understood, however, that embodiments of the invention are more generally applicable to any image processing system or associated device or technique that involves processing of edges in one or more images.

Figure 1:
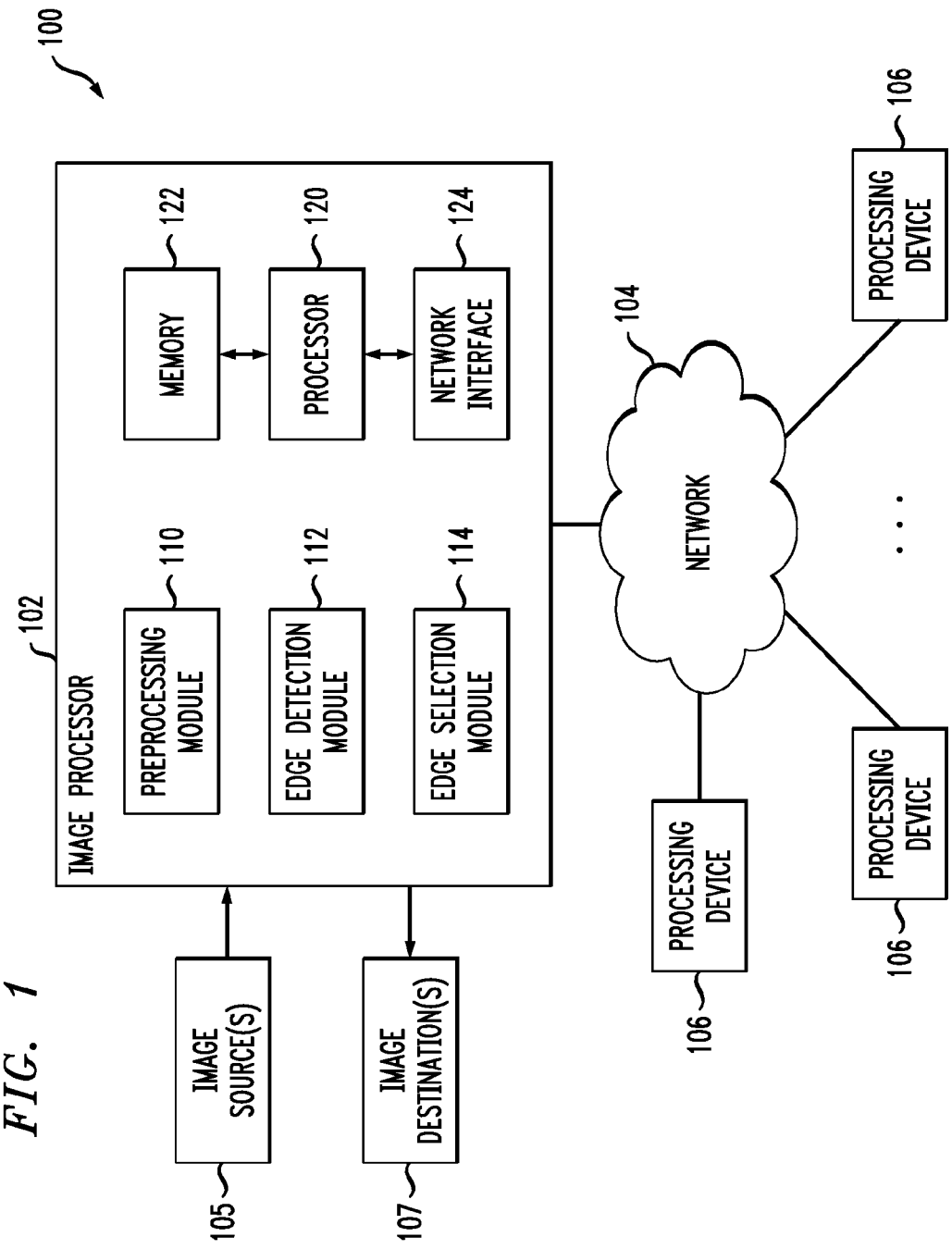
FIG. 1 is a block diagram of an image processing system comprising an image processor with edge selection functionality in one embodiment.

FIG. 1 shows an image processing system 100 in an embodiment of the invention. The image processing system 100 comprises an image processor 102 that receives images from one or more image sources 105 and provides processed images to one or more image destinations 107. The image processor 102 also communicates over a network 104 with a plurality of processing devices 106.

Although the image source(s) 105 and image destination(s) 107 are shown as being separate from the processing devices 106 in FIG. 1, at least a subset of such sources and destinations may be implemented as least in part utilizing one or more of the processing devices 106. Accordingly, images may be provided to the image processor 102 over network 104 for processing from one or more of the processing devices 106. Similarly, processed images may be delivered by the image processor 102 over network 104 to one or more of the processing devices 106. Such processing devices may therefore be viewed as examples of image sources or image destinations.

A given image source may comprise, for example, a 3D imager such as an SL camera or a ToF camera configured to generate depth images, or a 2D imager configured to generate grayscale images, color images, infrared images or other types of 2D images. Another example of an image source is a storage device or server that provides images to the image processor 102 for processing.

A given image destination may comprise, for example, one or more display screens of a human-machine interface of a computer or mobile phone, or at least one storage device or server that receives processed images from the image processor 102.

Also, although the image source(s) 105 and image destination(s) 107 are shown as being separate from the image processor 102 in FIG. 1, the image processor 102 may be at least partially combined with at least a subset of the one or more image sources and the one or more image destinations on a common processing device. Thus, for example, a given image source and the image processor 102 may be collectively implemented on the same processing device. Similarly, a given image destination and the image processor 102 may be collectively implemented on the same processing device.

In the present embodiment, the image processor 102 is configured to perform an edge detection operation on a first image from a given image source in order to obtain a second image, to identify particular edges of the second image that exhibit at least a specified reliability, and to generate a third image comprising the particular edges and excluding other edges of the second image.

The image processor 102 as illustrated in FIG. 1 includes a preprocessing module 110, an edge detection module 112 and an edge selection module 114. The edge detection module 112 is configured to perform the edge detection operation on the first image supplied by a given image source, and the edge selection module 114 is configured to identify the particular edges of the second image that exhibit at least the specified reliability. The preprocessor module 110 is assumed to be coupled or otherwise arranged between the given image source and an input of the edge detection module 112, and is configured to apply preprocessing operations such as denoising and equalization to the first image before that image is subject to the edge detection operation in the edge detection module 112.

As one possible example of the above-noted first, second and third images, the first image in given embodiment may comprise a depth image generated by a depth imager such as an SL camera or a ToF camera, the second image may comprise an edge map or other type of edge image generated by applying the edge detection operation to the depth image in edge detection module 112, and the third image may comprise a modified edge image having only the particular edges that are selected by the edge selection module 114 as exhibiting at least the specified reliability. Other types and arrangements of images may be received, processed and generated in other embodiments.

The particular number and arrangement of modules shown in image processor 102 in the FIG. 1 embodiment can be varied in other embodiments. For example, in other embodiments two or more of these modules may be combined into a lesser number of modules. An otherwise conventional image processing integrated circuit or other type of image processing circuitry suitably modified to perform processing operations as disclosed herein may be used to implement at least a portion of one or more of the modules 110, 112 and 114 of image processor 102.

The operation of the edge selection module 114 will be described in greater detail below in conjunction with the flow diagrams of FIGS. 2 and 5. Each of these flow diagrams illustrates a different process for identifying reliable edges in an edge image provided by the edge detection module 112.

A modified edge image having only the particular edges that exhibit at least the specified reliability as generated by the image processor 102 may be subject to additional processing operations in the image processor 102, such as, for example, feature extraction, pattern identification, gesture recognition, object recognition and tracking.

Alternatively, a modified edge image having only the particular edges that exhibit at least the specified reliability as generated by the image processor 102 may be provided to one or more of the processing devices 106 over the network 104. One or more such processing devices may comprise respective image processors configured to perform the above-noted subsequent operations such as feature extraction, pattern identification, gesture recognition, object recognition and tracking.

The processing devices 106 may comprise, for example, computers, mobile phones, servers or storage devices, in any combination. One or more such devices also may include, for example, display screens or other user interfaces that are utilized to present images generated by the image processor 102. The processing devices 106 may therefore comprise a wide variety of different destination devices that receive processed image streams from the image processor 102 over the network 104, including by way of example at least one server or storage device that receives one or more processed image streams from the image processor 102.

Although shown as being separate from the processing devices 106 in the present embodiment, the image processor 102 may be at least partially combined with one or more of the processing devices 106. Thus, for example, the image processor 102 may be implemented at least in part using a given one of the processing devices 106. By way of example, a computer or mobile phone may be configured to incorporate the image processor 102 and possibly a given image source. The image source(s) 105 may therefore comprise cameras or other imagers associated with a computer, mobile phone or other processing device. As indicated previously, the image processor 102 may be at least partially combined with one or more image sources or image destinations on a common processing device.

The image processor 102 in the present embodiment is assumed to be implemented using at least one processing device and comprises a processor 120 coupled to a memory 122. The processor 120 executes software code stored in the memory 122 in order to control the performance of image processing operations. The image processor 102 also comprises a network interface 124 that supports communication over network 104.

The processor 120 may comprise, for example, a microprocessor, an application-specific integrated circuit (ASIC), a field-programmable gate array (FPGA), a central processing unit (CPU), an arithmetic logic unit (ALU), a digital signal processor (DSP), or other similar processing device component, as well as other types and arrangements of image processing circuitry, in any combination.

The memory 122 stores software code for execution by the processor 120 in implementing portions of the functionality of image processor 102, such as portions of modules 110, 112 and 114. A given such memory that stores software code for execution by a corresponding processor is an example of what is more generally referred to herein as a computer-readable medium or other type of computer program product having computer program code embodied therein, and may comprise, for example, electronic memory such as random access memory (RAM) or read-only memory (ROM), magnetic memory, optical memory, or other types of storage devices in any combination. As indicated above, the processor may comprise portions or combinations of a microprocessor, ASIC, FPGA, CPU, ALU, DSP or other image processing circuitry.

It should also be appreciated that embodiments of the invention may be implemented in the form of integrated circuits. In a given such integrated circuit implementation, identical die are typically formed in a repeated pattern on a surface of a semiconductor wafer. Each die includes an image processor or other image processing circuitry as described herein, and may include other structures or circuits. The individual die are cut or diced from the wafer, then packaged as an integrated circuit. One skilled in the art would know how to dice wafers and package die to produce integrated circuits. Integrated circuits so manufactured are considered embodiments of the invention.

The particular configuration of image processing system 100 as shown in FIG. 1 is exemplary only, and the system 100 in other embodiments may include other elements in addition to or in place of those specifically shown, including one or more elements of a type commonly found in a conventional implementation of such a system.

For example, in some embodiments, the image processing system 100 is implemented as a video gaming system or other type of gesture-based system that processes image streams in order to recognize user gestures. The disclosed techniques can be similarly adapted for use in a wide variety of other systems requiring a gesture-based human-machine interface, and can also be applied to applications other than gesture recognition, such as machine vision systems in robotics and other industrial applications.

Figure 2:
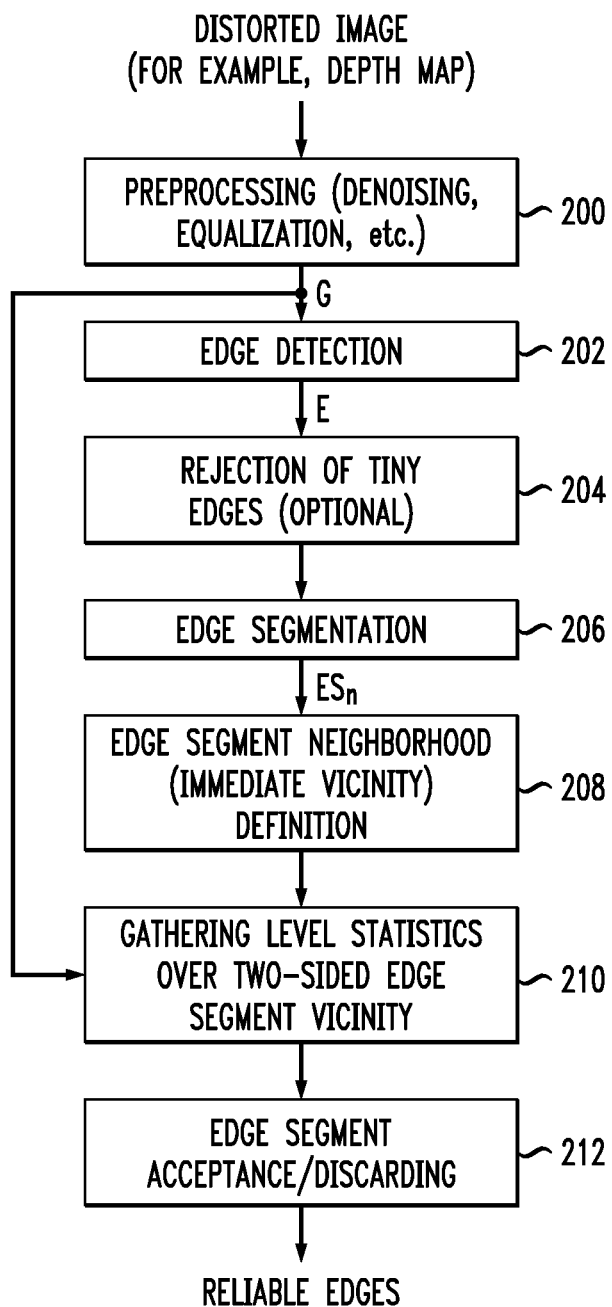
FIG. 2 is a flow diagram of an exemplary process for identifying reliable edges in an edge image using the image processor of the FIG. 1 system.

Referring now to FIG. 2, an exemplary process is shown for identifying reliable edges in an edge image in the image processing system 100 of FIG. 1. The FIG. 2 process is assumed to be implemented by the image processor 102 using its edge selection module 114. The process in this embodiment includes steps 200 through 212. It is assumed in this embodiment that an input image received in the image processor 102 from an image source 105 is a distorted image, such as a depth map or other depth image from a depth imager.

In step 200, preprocessing is applied to the input image in order to generate a grayscale image G. The preprocessing may involve operations such as, for example, denoising, equalization, etc. The grayscale image G in the present embodiment is an example of what is more generally referred to herein as a "first image."

In step 202, an edge detection operation is performed on the grayscale image G in order to obtain an edge image E. The edge image E in the present embodiment is an example of what is more generally referred to herein as a "second image." Any of a wide variety of known edge detection techniques may be applied to generate the edge image E in step 202. Examples of such edge detection techniques are disclosed in, for example, J. Canny, "A computational approach to edge detection," IEEE Transactions on Pattern Analysis and Machine Intelligence, Vol. PAMI-8, Issue 6, pp. 679-698, November 1986; R. Kimmel and A. M. Bruckstein, "On regularized Laplacian zero crossings and other optimal edge integrators," International Journal of Computer Vision, 53(3): 225-243, 2003; and W. K. Pratt, Digital Image Processing, $3^{rd}$ Edition, John Wiley & Sons, 2001, which are incorporated by reference herein. In applying a given edge detection operation in step 202, any associated edge detection threshold should be set sufficiently low so as to ensure retention of important edges, as the subsequent processing to be described will ensure rejection of unreliable edges.

It should be noted that the term "image" as used herein is intended to be broadly construed, and in the context of the edge image E may comprise, for example, an edge map or other set of pixel information characterizing detected edges. The term "edge" is also intended to be broadly construed, so as to encompass, for example, a set of pixels in a given image that are associated with a transition between part of a periphery of an imaged object and other portions of the image.

In step 204, certain edges in the edge image E may be optionally rejected as being of insufficient size.

Figure 3:
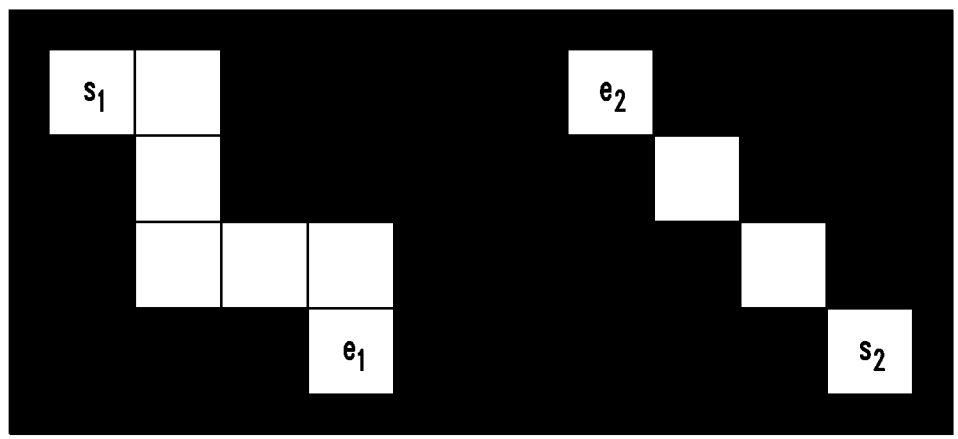
FIGS. 3, 4A and 4B show examples of identified edge segments in portions of an edge image.

In step 206, an edge segmentation operation is applied to the edge image E after optional rejection of any undersized edges in step 304. The edge segmentation operation identifies a plurality of distinct edge segments denoted $ES_n$, n=1, ... N. Examples of edge segments identified in portions of an edge image are shown in FIGS. 3 and 4. In these examples, each box of a given edge segment corresponds to a particular pixel of the edge image E, and all edges are assumed to be one pixel thick. Also, the pixels associated with edge segments are illustratively shown as white, and all other pixels in the portions of the edge image shown are illustratively shown as black, although edge and non-edge pixels may be characterized in other ways in other embodiments. For example, the terms "white" and "black" as used herein to characterize respective edge and non-edge pixels may additionally or alternatively be expressed using binary values such as "1" and "0" respectively.

Figure 4A:
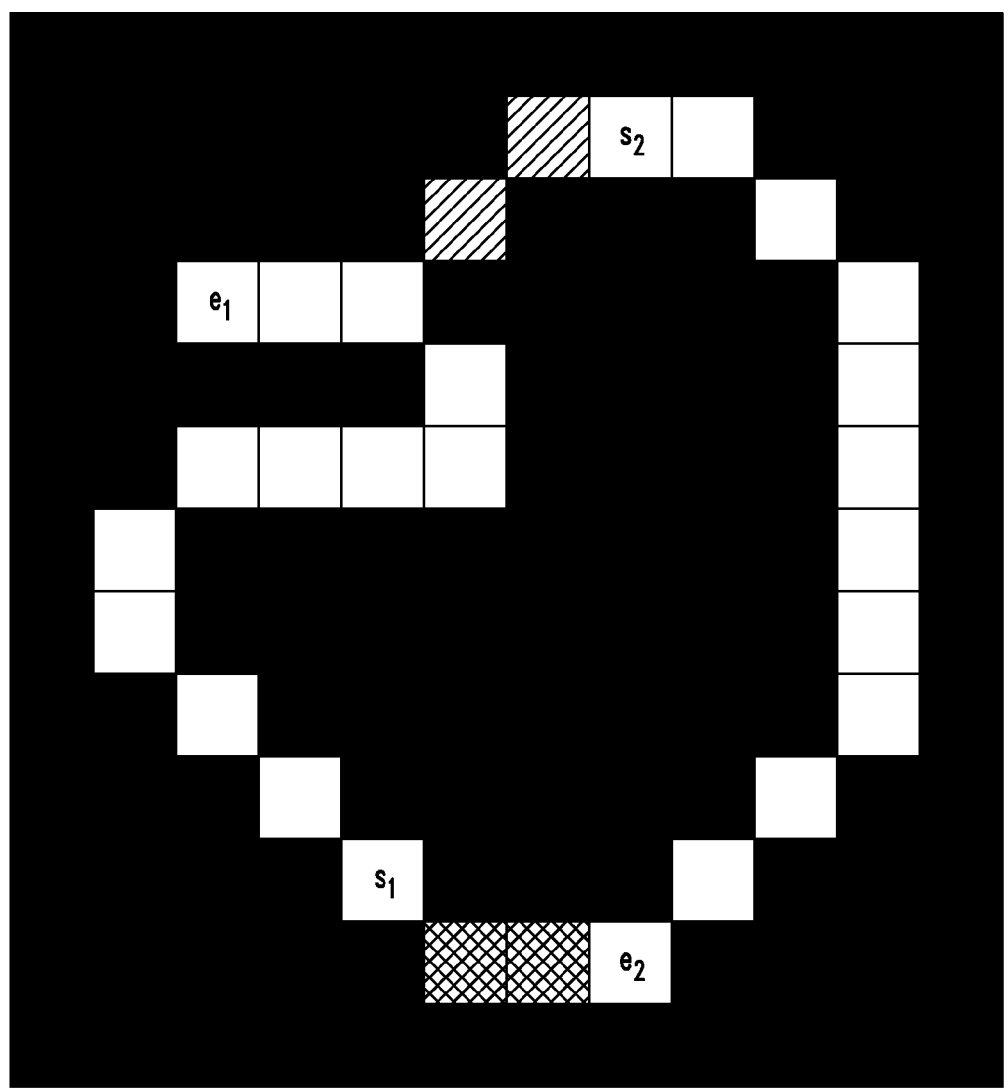
Figure 4B:
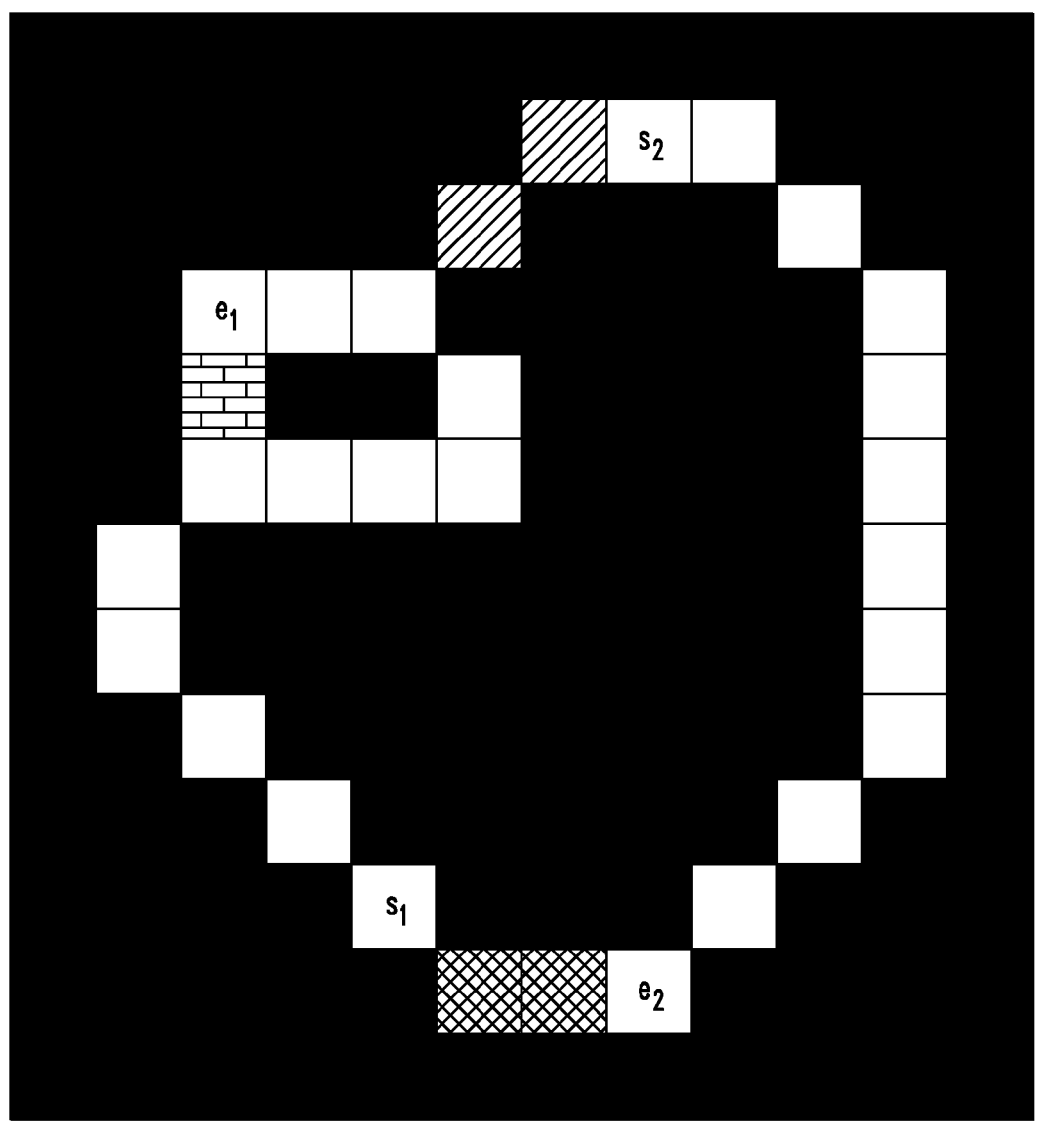

The two exemplary edge segments $ES_1$ and $ES_2$ shown in FIG. 3 have starting pixels $s_i$ and ending pixels $e_i$, where i=1 or 2. The first edge segment $ES_1$ on the left includes filled corner positions, while the second edge segment $ES_2$ on the right includes non-filled corner positions. FIGS. 4A and 4B each similarly show two additional exemplary edge segments $ES_i$ with starting pixels $s_i$ and ending pixels $e_i$, where i=1 or 2. Numerous other types of edge segments may be generated in step 206. For example, edge segments in other embodiments may be more than one pixel in thickness.

As will be described in greater detail below, the edge segmentation operation may be characterized as splitting a branched edge graph into elementary curve segments such that each element segment includes no branching.

More particularly, the edge image E in the edge segmentation operation of step 206 is split into a finite set of localized non-intersecting but possibly adjacent elementary curve segments $ES_n$, n=1, ... N. Each segment is characterized by its starting pixel $s_n$, ending pixel $e_n$ and number of adjacent pixels, if any, between the starting and ending pixels such that there are no gaps between $s_n$ and $e_n$, there is no branching between $s_n$ and $e_n$, and the length of a curve segment is greater than or equal to two pixels but has no upper bound other than that implied by the image resolution.

As one example, this type of edge segmentation operation may be implemented using the following steps:

1. Locate an arbitrary edge pixel in the edge image E and determine if it is a single isolated pixel. If it is, erase that edge pixel and repeat step 1 until a non-isolated edge pixel is found or all edge pixels are erased, at which point the edge segmentation operation is terminated. It will be assumed for description of this embodiment and elsewhere herein that edge pixels are white and non-edge pixels are black, as in the examples of FIGS. 3 and 4. Thus, locating an arbitrary edge pixel involves locating a white pixel, and erasing an edge pixel involves setting that pixel to black.

2. If the located edge pixel has exactly one immediate neighbor white pixel, mark the located edge pixel as a starting pixel $s_n$ and move along the edge in the only possible direction, visiting each pixel. If the located edge pixel has two or more immediate neighbor white pixels, move along the corresponding edges in each of the possible directions and visit each pixel. The different possible directions represent respective branches, and to avoid branch overlapping only one of the branches should be considered as having the originally located edge pixel as its starting pixel $s_n$. Movement along an edge stops once the corresponding edge segment ends or branches into two or more directions. In both cases, the edge pixel at which movement stops is considered either a starting or ending pixel. A given edge segment is completely acquired once its starting and ending pixels are identified. Visited edge pixels should be recorded or otherwise marked in order to allow edge segments to be fully characterized as their respective ending pixels are identified. This recording or marking also helps to avoid the possibility that a given edge pixel may be included two or more times in the same edge segment, as in the case of a looped edge.

3. Repeat steps 1 and 2 until there are no longer any non-isolated edge pixels left in the edge image E. Thus, steps 1 and 2 are repeated until all non-isolated edge pixels in E are either erased or considered part of one of the edge segments.

4. Optionally erase any edge segments that have fewer than a designated number of edge pixels. This is similar to the optional edge rejection performed in step 204, but is applied to identified edge segments. It can help to reduce the complexity of subsequent steps 208, 210 and 212 of the FIG. 2 process, but edges that are presented by multiple small segments will be lost, possibly leading to degraded performance in some circumstances.

The output of the exemplary four-step edge segmentation operation described above is a set of disjoint non-branching edge segments $ES_n$, n=1, ... N.

It should be noted that if the edge image E is already configured in such a manner that it provides edge segments having properties the same as or similar to the above-described edge segments $ES_n$, the edge segmentation operation of step 206 may be eliminated.

In step 208, edge segment neighborhoods are defined for the respective edge segments $ES_n$. The neighborhoods in this embodiment comprise respective immediate vicinities, although other types of vicinities may be used in other embodiments. The neighborhoods are therefore considered an example of what are more generally referred to herein as "vicinities" of the respective edge segments.

A number of different examples of the manner in which edge segment neighborhoods may be defined in step 208 will now be described.

In a first example, neighborhoods are determined for respective edge segments based on edge loop closing, using the following steps:

1. Set all frame border pixels of the edge segmented image output of step 206 to white, thereby defining them as surrogate edge segments. These four surrogate edge segments, one associated with each side of the segmented image, are numbered as edge segments N+1 to N+4, respectively.

2. For each edge segment $ES_n$, n=1, ... N, find for each of its starting and ending pixels $s_n$ and $e_n$ the nearest white pixel among all white pixels of all other edge segments $ES_m$, m=1, ..., N+4, m≠n, and connect $s_n$ and $e_n$ by straight line segments to their respective nearest white pixels. The "nearest" white pixel may be determined using Euclidean distance, Manhattan distance, or other types of distance measures.

3. Repeat step 2 for one or more of the edge segments until no additional unconnected starting or ending pixels are available.

At this point there will be a number of closed edge loops. The two exemplary edge segments $ES_1$ and $ES_2$ of FIG. 4A form one such closed edge loop, with the connecting straight line segments being denoted by shaded pixels. In this case, one straight line segment of two shaded pixels connects an intermediate white pixel of $ES_1$ to starting pixel $s_2$ of $ES_2$, and another straight line segment of two shaded pixels connects starting pixel $s_1$ of $ES_1$ to ending pixel $e_2$ of $ES_2$. Accordingly, in the particular example illustrated in FIG. 4A, hanging ends of each edge segment are connected to the nearest white pixel in the other segment.

In some implementations of the edge loop closing process using steps 2 and 3 as described above, very long edges embracing large regions can appear. If this is the case, estimated edge reliability statistics may vary significantly, leading to spreading of properties from one edge segment part to another edge segment part within the same segment. This situation can be addressed by applying an additional pixel connection rule as follows. After performing steps 2 and 3, connect two white pixels from the same or different edge segments with a straight line segment if and only if the two white pixels are separated by at most D_join black pixels along the shortest path, and both white pixels are either separated from one another by more than D_disjoin white pixels along the same edge segment or belong to different edge segments.

The result of application of this additional pixel connecting rule to the closed edge loop of FIG. 4A is illustrated in FIG. 4B. In this example, an additional straight line segment of one shaded pixel connects ending pixel $e_1$ of $ES_1$ to an intermediate white pixel of $ES_1$.

The parameter D_join determines the number of additional edge segment loops that will appear, and the higher its value, the more detailed the closed loop decomposition will be, which tends to make better localized edge segments available for subsequent processing. Values of D_join in the range of about 1 to 5 set a reasonable compromise between computational complexity and edge quality for low-resolution images. The parameter D_disjoin is used to prevent connection of close parts of the same edge segment. Suitable values for this parameter are in the range of about 5 to 20 for low-resolution images. Higher values may be used for images of better resolution. In the FIG. 4B example, these parameters are selected such that D_join>=1 and D_disjoin<=5.

4. For each edge segment $ES_n$, n=1, ... N, locate a pair of pixels, one on each side of $ES_n$, to define adjacent regions for region filling. At least two adjacent regions are assigned to each edge segment $ES_n$.

5. For each edge segment $ES_n$, n=1, ..., N, fill its adjacent regions as determined in step 4 using a fast filling algorithm, such as a flood fill or quick fill algorithm. Each set of filled adjacent regions represents a set of pixels that will be used for statistics gathering for the corresponding edge segment in step 210.

In the foregoing example, multiple edge segments that are connected together in step 2 may share one or more of the same filled regions. Accordingly, in order to reduce the computational complexity associated with region filling, each such shared region can be filled once and then all edge segments which share that region can be identified and will share the corresponding statistics gathered in step 210. Also, in the course of edge segment connection, one segment can be split into two or more parts by connection of its intermediate pixels to starting or ending pixels of other segments.

Although this neighborhood definition example exhibits a higher computational complexity than the other neighborhood definition examples to be described below, it also provides increased edge verification confidence because it involves statistical sampling over larger neighborhoods of pixels for each edge segment.

In a second example, neighborhoods are determined for respective edge segments based on a maximal vicinity radius parameter, using the following steps:

1. For each edge segment $ES_n$, n=1, ... N, extend both ends of the edge segment up to $R_v$ pixels each, using straight line segments. If in the course of this extending process, the edge segment as extended meets a white pixel, connect the edge segment to the white pixel and stop expanding the edge segment. The parameter $R_v$ is a positive integer denoting vicinity radius. The larger the vicinity radius $R_v$, the more pixels will be included in the neighborhoods defined for the respective edge segments.

2. For each extended edge segment from step 1, locate all pixels on each side of the extended edge segment that are situated not farther than $R_v$ from the edge segment $ES_n$ prior to the step 1 extension and not farther than the first white pixel met while extending the edge segment.

The use of edge segment extension in this example facilitates the determination of appropriate neighborhoods encompassing both sides of each edge segment. Its computational complexity is significantly reduced relative to that of the previous example, but for typical depth images it can provide a comparable amount of edge verification confidence.

In a third example, neighborhoods are determined for respective edge segments based on a maximal vicinity distance along a sliding perpendicular line, using the following step:

1. For each edge segment $ES_n$, n=1, . . . N, at each pixel of the edge segment construct a perpendicular line to a current tangent line of the edge segment, move along the perpendicular line in both directions to a distance of up to $D_v$ pixels or until a white pixel is met, and join all visited pixels to the neighborhood for the edge segment. The resulting neighborhood resembles a strip of pixels of width $2D_v$ and the edge itself is situated in the middle of the strip.

Like the previous example, this third example also utilizes a single positive integer parameter, in this case the maximal vicinity distance $D_v$, and accordingly produces a neighborhood similar to that produced in the previous example. The larger the vicinity distance $D_v$, the more pixels will be included in the neighborhoods defined for the respective edge segments. This example has a computational complexity that is less than that of the first and second examples above, but again for typical depth images it can provide a comparable amount of edge verification confidence.

As indicated above, the term "vicinity" as used herein is intended to be more broadly construed than the exemplary neighborhoods described in conjunction with the previous examples. The vicinity for a given edge segment may more generally comprise, although again by way of example, subsets of pixels lying on respective sides of a closed edge curve with the subsets being completely separated from one another by the corresponding edge. A wide variety of different techniques may be used to select and weight vicinity pixels for use in obtaining level statistics as described below, and a particular one of these techniques may be determined for use in a given application by taking into account factors such as computational complexity and desired edge verification confidence.

In step 210, the grayscale image G at the output of the preprocessing step 200 and the edge segment neighborhoods defined in step 208 are utilized to obtain level statistics for the edge segments. In this embodiment, grayscale level statistics are gathered over two-sided edge segment vicinities. As will be described in greater detail below, this may involve, for example, estimating local grayscale level parameters on both sides of every edge segment. The level statistics may therefore comprise information such as two-sided lateral mean-like values and associated variance estimates for the respective edge segments.

More particularly, gathering of level statistics in step 210 may involve evaluation of a characteristic integral grayscale level $MG_p(n,s)$ for an edge segment vicinity defined over two sides s, s=1 or 2, of edge segment $ES_n$, n=1, . . . N. The grayscale level may be representative of depth or distance, brightness, temperature, density or other physical attributes of objects in an imaged scene, depending upon the specific nature of the image G. It should be noted in this regard that the term "depth" is intended to be broadly construed so as to encompass distance measures.

The integral grayscale level $MG_p(n,s)$ can be defined in a variety of different ways, including as a median value:

$$MG_p(n, s) = \underset{m=1}{\overset{M(n,s)}{\text{median}}}(g_m^p(n, s)),$$

or as a generalized mean:

$$MG_p(n, s) = \left(\frac{1}{M(n, s)} \sum_{m=1}^{M(n,s)} g_m^p(n, s)\right)^{1/p},$$

where M(n,s) denotes the total number of pixels in the vicinity determined in step 208 for the corresponding edge segment, p≥1 denotes a distance metric space parameter, and $g_m$(n,s) denotes pixel grayscale level. In the case of p=1, the generalized mean above reduces to a simple arithmetic mean $MG_1$(n,s).

If $MG_p$ (n,1) and $MG_p$(n,2) differ only slightly, an edge segment may be designated as unreliable and discarded, because it does not divide two geometrical regions of different integral grayscale level. For example, both sides of such an edge segment may belong to the same object in an imaged scene and therefore should not be separated by an edge. Conversely, a noticeable difference in integral grayscale levels for different sides of the edge segment indicates a step-like transition of image grayscale level and related object properties across the boundary defined by the edge segment. Such an edge segment may be designated as reliable and accepted.

Accordingly, possible level statistics indicative of the reliability of edge segment $ES_n$ can be based on the difference between $MG_p$ (n,1) and $MG_p$(n,2). This difference can be expressed in a number of different ways, including, for example, as a simple arithmetical difference:

$$\Delta MG_{psa}(n) = |MG_p(n,1) - MG_p(n,2)|,$$

a normalized arithmetical difference:

$$\Delta MG_{pna}(n) = |MG_p(n,1) - MG_p(n,2)| / |MG_p(n,1) + MG_p(n,2)|,$$

or a geometrical difference:

$$\Delta MG_{pg}(n) = \frac{\min(|MG_p(n, 1)|, |MG_p(n, 2)|)}{\max(|MG_p(n, 1)|, |MG_p(n, 2)|)}.$$

Another level statistic may comprise a grayscale level variance. Such a variance can be defined as follows:

$$\text{var}_p(n, s) = \frac{1}{M(n, s)} \sum_{m=1}^{M(n,s)} (g_m(n, s) - MG_p(n, s))^2.$$

Its value shows the uniformity of the edge segment vicinity. A higher variance generally indicates a less reliable estimate of ΔMG(n). In such a situation, a level smoother based on a weighted estimate of $MG_p$(n,s) can be used.

For example, such a weighted estimate can treat vicinity pixels nearer to the edge segment as having a higher importance, as follows:

$$MG_{pwd}(n, s) = \left(\frac{1}{M(n, s)} \sum_{m=1}^{M(n,s)} g_m^p(n, s) \cdot \frac{1}{\text{distance\_from\_edge}(g_m(n, s))^r}\right)^{1/p},$$

where parameter r>0 sets rate of pixel importance decrease as its distance from the edge segment rises. As another example, level outliers can be suppressed as follows:

$$MG_{pwl}(n, s) = \left( \frac{1}{M(n, s)} \sum_{m=1}^{M(n,s)} g_m^p(n, s) \cdot \frac{1}{|MG_p(n, s) - g_m(n, s)|^r} \right)^{1/p},$$

where parameter r sets the sharpness of the outlier suppression function.

These exemplary level smoothers can be combined together to operate as a bilateral filter. Alternatively, a conventional bilateral filter can be used, as will be appreciated by those skilled in the art.

Yet another level statistic can be based on the degree to which estimated levels depart from lower or upper bounds of a particular dynamic range. For example, the levels may be subject to noise and underflow on one side of an edge segment or saturation and overflow on the other side of the edge segment. The values inside the range show more statistical confidence, as indicated in the following:

$$\text{value\_confidence}(n, s) = \left( \frac{1}{M(n, s)} \sum_{m=1}^{M(n,s)} |g_m(n, s) - \text{saturation\_level}| \cdot |g_m(n, s) - \text{noise\_level}| \right),$$

where saturation_level denotes the top of the dynamic range, and noise_level denotes the bottom of the dynamic range. At the bottom of the dynamic range, the values are not measured accurately due to physical limitations of the imager. The higher value_confidence(n,s) is for a given pixel, the more precisely its grayscale level is determined by the imager.

The foregoing are just examples of level statistics that may be gathered for the various edge segments in step 210. It should be noted that statistics based on the level difference $\Delta MG(n)$ across the edge segment are generally more important in determining reliability of the edge segment than the other statistics such as $\text{var}_p(n,s)$ and value_confidence(n,s). The latter two statistics may be used, for example, to determine relevance of a given edge segment that has been identified as reliable using statistics based on the level difference $\Delta MG(n)$. Numerous other types of level statistics can be used in other embodiments, including statistics based on various types of image information levels other than grayscale levels.

In step 212, an accept or discard decision is generated for each of the edge segments based on the level statistics determined in step 210 and a specified threshold value. The threshold value in this embodiment establishes a particular reliability, which may be viewed as an example of what is more generally referred to herein as a "specified reliability." A given such specified reliability may denote a reliability value at or above which edge pixels are accepted and below which edge pixels are discarded. Accordingly, specified reliabilities for edges herein may encompass various threshold-based reliability measures. Numerous other types of specified reliabilities may be used in other embodiments. By way of illustrative example, the threshold value utilized in step 212 may be a unit-less normalized value such as 0<threshold<1, or another value such as min(G)<threshold<max(G) which is based on respective minimum and maximum grayscale values of image G.

As a more specific example, the decision as to whether edge segment $ES_n$ should be accepted or discarded may involve comparing the corresponding level difference $\Delta MG(n)$ to a threshold, possibly utilizing a particular one of the following rules or combinations of two or more of these rules:

1. If $\Delta MG_{psa}(n) \geq \text{threshold}_{psa}$, approve $ES_n$, otherwise remove $ES_n$ from G.
2. If $\Delta MG_{pna}(n) \geq \text{threshold}_{pna}$, approve $ES_n$, otherwise remove $ES_n$ from G.
3. If $\Delta MG_{pg}(n) \leq \text{threshold}_{pg}$, approve $ES_n$, otherwise remove $ES_n$ from G.

The FIG. 2 process can be pipelined in a straightforward manner. For example, at least a portion of steps 208, 210 and 212 can be performed in parallel for different edge segments identified in step 206, thereby reducing the overall latency of the process for a given input image, and facilitating implementation of the described techniques in real-time image processing applications. Also, vector processing in firmware can be used to accelerate portions of the process, such as the statistics gathering in step 210.

The accepted edge segments in step 212 collectively represent a set of reliable edges that are permitted to remain in a modified edge image provided by the image processor 102. As noted above, this modified edge image may be further processed in the image processor 102, or supplied to another processing device 106 or image destination 107. Each of the accepted edge segments may have an associated confidence estimate given by its associated level statistics or information derived therefrom.

Figure 5:
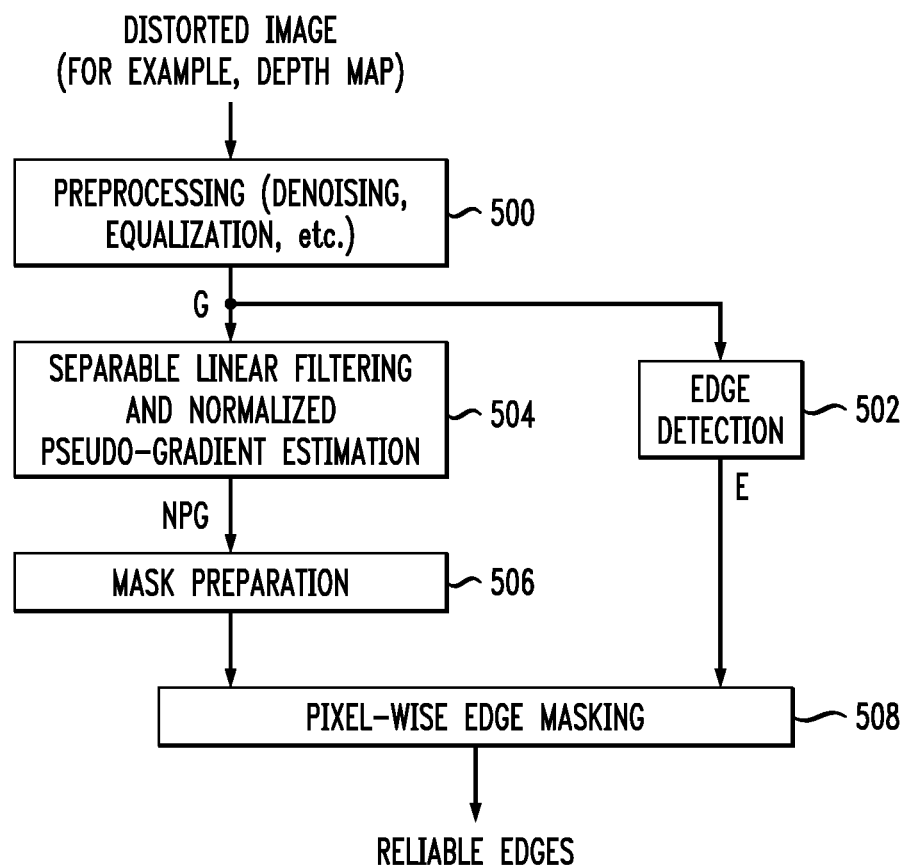
FIG. 5 is a flow diagram of another exemplary process for identifying reliable edges in an edge image using the image processor of the FIG. 1 system.

FIG. 5 illustrates another exemplary process for identifying reliable edges in an edge image in the FIG. 1 image processing system. Like the FIG. 2 process, the FIG. 5 process is assumed to be implemented by the image processor 102 using its edge selection module 114. The process in this embodiment includes steps 500 through 508. Steps 500 and 502 are respective preprocessing and edge detection steps that correspond generally to respective steps 200 and 202 in FIG. 2, and may be implemented in substantially the same manner as previously described.

In step 504, a separable linear filtering operation is applied to the grayscale image G and a normalized pseudo-gradient (NPG) is then generated from the resulting filtered grayscale image.

The separable linear filtering as applied to a given pixel G(i,j) of the grayscale image G in the present embodiment may be configured to utilize 2 L neighboring pixels along image height and width to obtain unidimensional linear sum-like and difference-like finite estimates, as follows:

$$gx(i, j) = \sum_{l=-L}^{L} G(i, j+l) w_g(l), \; gy(i, j) = \sum_{l=-L}^{L} G(i+l, j) w_g(l)$$

$$dx(i, j) = \sum_{l=-L}^{L} G(i, j+l) w_d(l), \; dy(i, j) = \sum_{l=-L}^{L} G(i+l, j) w_d(l).$$

where, from natural symmetrical and directional equivalence considerations, $w_g(l) = w_g(-1) \geq 0$, $w_d(l) = -w_d(-1)$, and therefore $w_d(0) = 0$. As a more particular example, the following computationally simple estimator for the case of L=3 can be applied:

$gx(i,j) = G(i,j-3) + G(i,j-2) + G(i,j-1) + G(i,j+1) + G(i,j+2) + G(i,j+3),$ $gy(i,j) = G(i-3,j) + G(i-2,j) + G(i-1,j) + G(i+1,j) + G(i+2,j) + G(i+3,j),$ $dx(i,j) = -G(i,j-3) - G(i,j-2) - G(i,j-1) + G(i,j+1) + G(i,j+2) + G(i,j+3),$ $dy(i,j) = -G(i-3,j) - G(i-2,j) - G(i-1,j) + G(i+1,j) + G(i+2,j) + G(i+3,j).$

It should be noted that the exemplary separable linear filters described above are separable in x and y, which helps to reduce the computational burden. However, other embodiments can use a wide variety of other types of filters, and those filters can include non-separable and non-linear filters of various types.

The NPG can be generated in the following manner. For each pair of estimates gx(i, j) and gy(i, j), find a corresponding level:

$$gm(i,j)=(|gx(i,j)|^p+|gy(i,j)|^p)^{1/p}.$$

If the imager providing the grayscale image G provides non-negative sample values only, the level determination can be simplified as follows:

$$gm(i,j)=(gx(i,j)^p+gy(i,j)^p)^{1/p}.$$

Minimal computational complexity is typically obtained for values of p=1 and p=∞, for which the previous equation reduces to gm(i,j)=|gx(i,j)|+|gy(i,j)| and gm(i,j)=max(|gx(i,j)|,|gy(i,j)|), respectively.

The present embodiment utilizes a characteristic property of images provided by SL or ToF cameras or other types of depth imagers. More particularly, in such depth imagers, the distance measurement uncertainty is typically a function of the distance to an imaged object. Let the distance measurement uncertainty as a function of distance G(i,j) be denoted DV(G(i, j)). For typical SL cameras, the following holds due to their use of triangulation to determine distance:

$$DV_{SL}(G(i,j)) \propto G^2(i,j),$$

while typical ToF cameras are characterized by slower accuracy loss:

$$DV_{ToF}(G(i,j)) \propto G(i,j).$$

The present embodiment utilizes this characteristic property of images provided by SL or ToF cameras or other types of depth imagers in generating the NPG in step 504.

By way of example, the NPG can be defined using the distance measurement uncertainty dependence DV(G(i, j)) as follows:

$$NPG(i,j)=\sqrt{dx^2(i,j)+dy^2(i,j)}/DV(gm(i,j)).$$

The square-rooted sum of squared differential components gx(i, j) and gy(i, j) in this equation for NPG provides a direction-invariant estimate of pseudo-gradient, and division by DV(·) provides automatic normalization of the result to the accuracy of the original pixel data in the neighborhood of G(i, j). This exemplary non-negative valued NPG(i, j) operates in a manner similar to a matched filter, in that it suppresses the impact of unreliable data regions and amplifies the impact of reliable data regions. It should be understood, however, that other NPGs may be used in other embodiments.

In step 506, an edge mask is generated based on the above-described NPG. As one possible example of a technique for generating the edge mask, the NPG is first smoothed using a rotation-invariant 2D low-pass filter (LPF) such as, for example, a 2D Gaussian filter. The smoothed NPG is then pixel-wise compared to a positive-valued constant importance threshold. All pixels in NPG (·) below the threshold are marked as black and all pixels above the threshold are marked as white:

$$PG_{thresholded}(i,j)=vrai(LPF(NPG(i,j))>threshold),$$

where vrai(true)=1 and vrai(false)=0. Finally, discontinuities are addressed using one or more applications of the following rule: if NPG(i, j)=0 and at least one of its immediate neighbors is 1, set NPG(i, j)=1. This portion of the procedure joins mistakenly separated parts of edges in the edge mask.

In step 508, the edge mask determined in step 506 is applied to the edge image E. More particularly, unreliable edges are eliminated in this step by pixel-wise mask application as follows:

$$E_{improved}(i,j)(E(i,j) \text{ and } \mathrm{mask}(i,j)),$$

where and in this context is the logical operator.

As in the FIG. 2 embodiment, the output of the FIG. 5 process is a set of reliable edges that are permitted to remain in a modified edge image provided by the image processor 102. Again, this modified edge image may be further processed in the image processor 102, or supplied to another processing device 106 or image destination 107.

The FIG. 5 process uses a localized pixel-based approach to determine whether or not a given edge pixel is part of a reliable edge. This approach utilizes localized statistics, typically involving relatively few neighboring pixels, in order to distinguish less precise edges associated with less important background objects from better defined edges associated with more important foreground objects. The edge reliability decision in the FIG. 5 process is made not for an edge segment as a whole as in the FIG. 2 process but is instead made separately for each of the edge pixels. Also, the FIG. 5 process takes into account the particular manner in which distance measurement uncertainty varies as a function of distance for the imager that provides the input image.

A number of simplifications can be made in the FIG. 5 process. For example, if the edge image E is already configured in such a manner that it provides edge segments having properties the same as or similar to the above-described edge segments $ES_n$, that information can be provided to step 504 to facilitate determination of appropriate neighboring pixels for each edge pixel. Also, various operations in the FIG. 5 process can be pipelined in a straightforward manner. For example, different mask regions can be separately computed and applied in parallel with one another in steps 504, 506 and 508.

It is therefore to be appreciated that the particular process steps used in the embodiments of FIGS. 2 and 5 are exemplary only, and other embodiments can utilize different types and arrangements of image processing operations. For example, the particular manner in which reliable edges are identified, and the particular manner in which a modified edge image is provided using the reliable edges, can be varied in other embodiments. Also, as noted above, steps indicated as being performed serially in the figure can be performed at least in part in parallel with one or more other steps in other embodiments.

Embodiments of the invention provide particularly efficient techniques for identifying reliable edges in an image. For example, these techniques can provide significantly improved edge images relative to conventional edge detection techniques that generally produce poor quality detected edges for certain types of images such as depth images from SL or ToF cameras or other types of depth imagers. Moreover, reliable edges are provided using the techniques disclosed herein without the cost and complexity of excessive parameter tuning that is often required for conventional edge detection operations.

Accordingly, reliable edge images provided in embodiments of the invention significantly enhance the effectiveness of subsequent image processing operations that utilize such edge images, including, for example, feature extraction, pattern identification, gesture recognition, object recognition and tracking.

It should again be emphasized that the embodiments of the invention as described herein are intended to be illustrative only. For example, other embodiments of the invention can be implemented utilizing a wide variety of different types and arrangements of image processing circuitry, modules and processing operations than those utilized in the particular embodiments described herein. In addition, the particular assumptions made herein in the context of describing certain embodiments need not apply in other embodiments. These and numerous other alternative embodiments within the scope of the following claims will be readily apparent to those skilled in the art.

What is claimed is:

1. A method comprising:
performing an edge detection operation on a first image to obtain a second image;
identifying particular edges of the second image that exhibit at least a specified reliability, comprising:
applying an edge segmentation operation to the second image to identify a plurality of distinct edge segments;
defining edge segment vicinities for the respective edge segments;
utilizing the first image and the edge segment vicinities to obtain level statistics for the edge segments; and
generating an accept or discard decision for each of the edge segments based on the level statistics and a specified threshold value; and
generating a third image comprising the particular edges and excluding other edges of the second image;
wherein said performing, identifying and generating are implemented in at least one processing device comprising a processor coupled to a memory.

2. The method of claim 1 wherein the first image comprises a depth image generated by a depth imager.

3. The method of claim 2 wherein the second image comprises an edge image generated by applying the edge detection operation to the depth image.

4. The method of claim 3 wherein the third image comprises a modified edge image having only the particular edges that exhibit at least the specified reliability.

5. The method of claim 1 wherein each of the distinct edge segments comprises a set of two or more adjacent edge pixels characterized by a starting pixel, an ending pixel and an absence of gaps or branches between the starting pixel and the ending pixel.

6. The method of claim 1 wherein defining edge segment vicinities for the respective edge segments comprises defining at least a given one of the edge segment vicinities based on one of edge loop closing, a maximal vicinity radius and a maximal vicinity distance along a sliding perpendicular line.

7. The method of claim 1 wherein the level statistics obtained for the edge segments comprise grayscale level statistics that are determined for each of the edge segments based on one or more integral grayscale levels for the corresponding edge segment vicinity defined over two sides of the edge segment.

8. The method of claim 7 wherein the accept or discard decision for a given one of the edge segments is based on a difference between a first integral grayscale level for a portion of the vicinity on a first side of the edge segment and a second integral grayscale level for a portion of the vicinity on a second side of the edge segment.

9. The method of claim 1 wherein identifying particular edges of the second image that exhibit at least a specified reliability further comprises:
applying a separable linear filtering operation to the first image to obtain a filtered first image;
generating a normalized pseudo-gradient from the filtered first image;
generating an edge mask based on the normalized pseudo-gradient; and
applying the edge mask to the second image.

10. A non-transitory computer-readable storage medium having computer program code embodied therein, wherein the computer program code when executed in a processing device causes the processing device to perform the method of claim 1.

11. An apparatus comprising:
at least one processing device comprising a processor coupled to a memory;
wherein said at least one processing device is configured:
to perform an edge detection operation on a first image to obtain a second image,
to identify particular edges of the second image that exhibit at least a specified reliability, wherein identification of the particular edges of the second image that exhibit at least the specified reliability includes said at least one processing device being configured:
to apply a separable linear filtering operation to the first image to obtain a filtered first image;
to generate a normalized pseudo-gradient from the filtered first image,
to generate an edge mask based on the normalized pseudo-gradient, and
to apply the edge mask to the second image, and
to generate a third image comprising the particular edges and excluding the other edges of the second image.

12. The apparatus of claim 11 wherein the processing device comprises an image processor, the image processor comprising:
an edge detection module configured to perform the edge detection operation; and
an edge selection module configured to identify the particular edges of the second image that exhibit at least the specified reliability.

13. The apparatus of claim 12 wherein the image processor further comprises a preprocessor module coupled between a source of the first image and an input of the edge detection module.

14. An image processing system comprising:
an image source providing at least a first image;
one or more image destinations; and
an image processor coupled between said image source and said one or more image destinations;
wherein the image processor is configured:
to perform an edge detection operation on a first image to obtain a second image,
to identify particular edges of the second image that exhibit at least a specified reliability, wherein identification of the particular edges of the second image that exhibit at least the specified reliability includes said image processor being configured:
to apply an edge segmentation operation to the second image to identify a plurality of distinct edge segments,
to define edge segment vicinities for the respective edge segments,
to utilize the first image and the edge segment vicinities to obtain level statistics for the edge segments, and
to generate an accept or discard decision for each of the edge segments based on the level statistics and a specified threshold value, to generate a third image comprising the particular edges and excluding other edges of the second image, and to provide the third image to said one or more image destinations.

15. The system of claim 14 wherein the image source comprises a depth imager.

16. The apparatus of claim 11 wherein the separable linear filtering operation as applied to a given pixel of the first image generates the following estimates:

$$gx(i,j) = \sum_{l=-L}^{L} G(i, j+l)w_g(l), \; gy(i,j) = \sum_{l=-L}^{L} G(i+l, j)w_g(l)$$

$$dx(i,j) = \sum_{l=-L}^{L} G(i, j+l)w_d(l), \; dy(i,j) = \sum_{l=-L}^{L} G(i+l, j)w_d(l),$$

where $G(i,j)$ denotes the given pixel, L denotes a local pixel neighborhood used for separable linear filtering of the given pixel, $w_g(l)=w_g(-l)\geq 0$, $w_d(l)=-w_d(-l)$, and $w_d(0)=0$.

17. The apparatus of claim 16 wherein the normalized pseudo-gradient is generated by determining, for each pair of estimates $gx(i,j)$ and $gy(i,j)$, a corresponding level:

$$gm(i,j)=(|gx(i,j)|^p+|gy(i,j)|^p)^{1/p},$$

and computing the normalized pseudo-gradient as follows:

$$NPG(i,j)=\sqrt{dx^2(i,j)+dy^2(i,j)}/DV(gm(i,j)),$$

where $DV(G(i,j))$ denotes distance measurement uncertainty as a function of distance for the first image, and where $p \geq 1$.

18. The apparatus of claim 11 wherein generation of the edge mask based on the normalized pseudo-gradient includes said at least one processing device being configured:
to smooth the normalized pseudo-gradient using a rotation-invariant low-pass filter;
to compare each pixel of the smoothed normalized pseudo-gradient to a threshold; and
to generate the edge map based on results of said comparing.

19. The apparatus of claim 11 wherein application of the edge mask to the second image includes said at least one processing device being configured to eliminate unreliable edges in the second image by pixel-wise application of the edge mask in accordance with the following equation:

$$E_{improved}(i,j)=(E(i,j) \text{ and } mask(i,j)),$$

wherein $E(i,j)$ denotes a pixel of the second image, $E_{improved}(i,j)$ denotes a pixel of the third image, and denotes a logical operator and $mask(i,j)$ denotes a pixel of the edge mask.

20. The system of claim 15 wherein the second image comprises an edge image generated by applying the edge detection operation to the depth image.

* * * * *